(12) United States Patent
Pohoryles

(10) Patent No.: US 11,726,657 B1
(45) Date of Patent: Aug. 15, 2023

(54) KEYBOARD INPUT METHOD, SYSTEM, AND TECHNIQUES

(71) Applicant: Daniel Pohoryles, Raanana (IL)

(72) Inventor: Daniel Pohoryles, Raanana (IL)

( * ) Notice: Subject to any disclaimer, the term of this patent is extended or adjusted under 35 U.S.C. 154(b) by 0 days.

(21) Appl. No.: 18/116,149

(22) Filed: Mar. 1, 2023

(51) Int. Cl.
*G06F 3/04895* (2022.01)
*G06F 3/16* (2006.01)
*G06F 3/0489* (2022.01)
*G06F 3/01* (2006.01)

(52) U.S. Cl.
CPC .......... *G06F 3/04895* (2013.01); *G06F 3/016* (2013.01); *G06F 3/04897* (2013.01); *G06F 3/167* (2013.01); *G06F 2203/0381* (2013.01)

(58) Field of Classification Search
CPC .. G06F 3/04886; G06F 3/0238; G06F 3/0219; G06F 3/04895; G06F 40/274; H04M 1/72481; H04M 1/72475
USPC ......... 345/156, 168; 400/489; 715/763, 773; 341/21–22
See application file for complete search history.

(56) References Cited

U.S. PATENT DOCUMENTS

| | | | |
|---|---|---|---|
| 8,490,008 B2 | 7/2013 | Griffin et al. | |
| 9,223,497 B2 | 12/2015 | Pasquero et al. | |
| 9,235,374 B2 | 1/2016 | Sirpal et al. | |
| 9,310,889 B2 | 4/2016 | Griffin et al. | |
| 9,652,448 B2 | 5/2017 | Pasquero et al. | |
| 10,037,319 B2 | 7/2018 | Medlock et al. | |
| 10,057,402 B2 | 8/2018 | Yuen et al. | |
| 10,073,829 B2 | 9/2018 | Medlock et al. | |
| 10,402,493 B2 | 9/2019 | Spencer et al. | |
| 10,809,914 B2 | 10/2020 | Clements et al. | |
| 11,150,804 B2 | 10/2021 | Zhai et al. | |
| 2010/0171700 A1 | 7/2010 | Sharan | |
| 2011/0078563 A1 | 3/2011 | Archer | |
| 2012/0113008 A1* | 5/2012 | Makinen | G06F 3/04883 345/168 |
| 2015/0128049 A1* | 5/2015 | Block | G06F 3/04817 715/728 |
| 2015/0134642 A1 | 5/2015 | Chomley | |
| 2015/0378982 A1 | 12/2015 | McKenzie | |
| 2016/0202904 A1 | 7/2016 | Huang et al. | |

(Continued)

FOREIGN PATENT DOCUMENTS

| | | |
|---|---|---|
| EP | 2618239 B1 | 10/2016 |
| JP | 2007524949 A | 8/2007 |

OTHER PUBLICATIONS

Boricha, Mehul. "12 Best iOS Keyboard Apps for iPhone and iPad." Tech Arrival, May 12, 2021, techrrival.com/best-ios-keyboard-apps/. Accessed Oct. 9, 2022, 17 pages.

(Continued)

*Primary Examiner* — Koosha Sharifi-Tafreshi
(74) *Attorney, Agent, or Firm* — Lowe Graham Jones PLLC; Ellen M. Bierman

(57) ABSTRACT

Methods, systems, and techniques for keyboards for improving user keyboard input for the visually impaired are provided. Example embodiments provide a Doubletriple Keyboard System ("DKS"), which enables visually impaired users to type text by providing large or extra-large keys, and enhanced feedback mechanisms to assist in reducing user input errors. For example, the DKS provides specific sound and/or specific color for each key to assist the visually impaired when selecting a key.

20 Claims, 19 Drawing Sheets

(56) References Cited

U.S. PATENT DOCUMENTS

2018/0173692 A1  6/2018  Greenberg
2019/0235714 A1  8/2019  Bilange et al.
2020/0257447 A1  8/2020  Zhai et al.

OTHER PUBLICATIONS

Hill, Simon, and Jackie Dove. "The best keyboard apps for iPhone in 2022." Digital Trends, Apr. 12, 2022, www.digitaltrends.com/mobile/best-iphone-keyboard-apps/. Accessed Oct. 9, 2022, 22 pages.
Pohoryles, Daniel, "Contextual Keyboard Input Method, System, and Techniques", U.S. Appl. No. 17/994,972, filed Nov. 28, 2022.

* cited by examiner

KEYBOARD INPUT METHOD, SYSTEM, AND TECHNIQUES

TECHNICAL FIELD

The present disclosure relates to methods, techniques, and systems for keyboarding and, in particular, to methods, techniques, and systems for a virtual and/or physical keyboard that supports input designed to assist the visually impaired or visually challenged.

BACKGROUND

Mobile devices, especially those of smaller footprints such as mobile phones, prove difficult for users to type on, particularly when the keys, virtual or physical, are small and/or when the user is visually or dexterity challenged. Such small sizes may prevent users for entering text.

Some keyboard applications have been created with limited ability to provide alternative virtual keyboards (software-based keyboards) on mobile devices. For example, on APPLE's iOS operating system, keyboards with alternative themes, some autocompletion capabilities, ability to add emojis, etc. have been made available. The operating system of such mobile devices allows users to configure use of the phone with such alternative keyboards.

DETAILED DESCRIPTION

Figure 1:
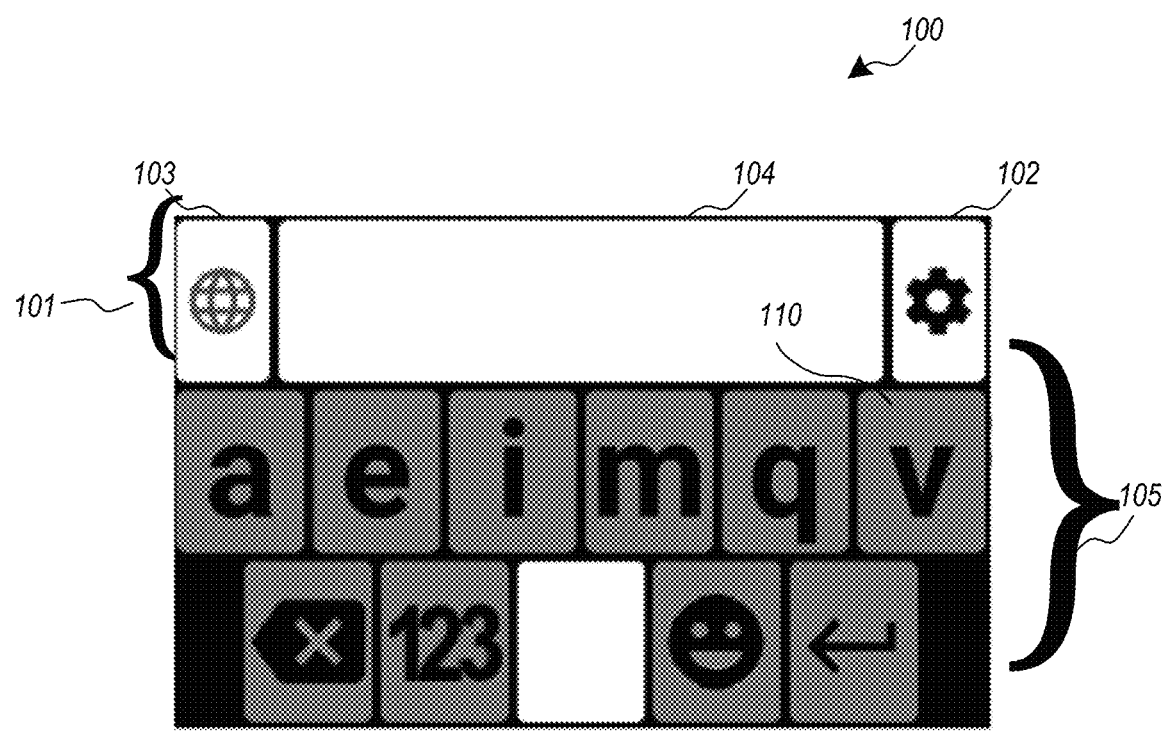
FIG. 1 is an example screen display of the upper level of an example doubletriple keyboard system deployment.

Embodiments described herein provide enhanced computer-based methods, techniques, and systems for improving visually challenged user keyboard input, especially on smaller footprint mobile devices. Example embodiments provide a Doubletriple Keyboard ("DK") and Doubletriple Keyboard System ("DKS"), which enables visually challenged users to type text when they would otherwise not have been able to do so. The DKS implements and presents a succession of screens with large keys configured to allow the user to tap on these screens until arriving at the desired key. The DKS also determines and optionally presents a prediction of the intended word, based on what the user has typed in the current word and in the previous words.

The example doubletriple keyboards and doubletriple keyboard systems described herein provide a keyboard input method for mobile and non-mobile devices. It has initially been deployed on Android and iOS operating systems for mobile devices and can be adapted to other operating systems through "hooks" into these operating systems. The DKS input method adds new elements and capabilities to the current keyboards used in conjunction with mobile and non-mobile devices. Although described herein mostly in conjunction with mobile devices, the doubletriple keyboard may also be used with hardware keyboards with suitable adaptations. It also may be used with keyboards that are physically part of a device such as those connected to laptop computers and it may also be used by stand-alone hardware keyboards that are linked to a device with Bluetooth, wired, or other wireless communications.

The doubletriple keyboard and doubletriple keyboard system allows visually challenged (and/or visually impaired) users to type on mobile keyboards by optimizing the keys presented.

Among other aspects, the doubletriple keyboard and doubletriple keyboard system provides an improvement for visually challenged users over traditional keyboards and existing software keyboard applications by:

Allowing increase of the size of the keys to a size that is not attainable with current keyboard technology.

Allowing association of a specific sound to each individual key.

Allowing association of a specific color to each individual key.

Other associated enhancements (such as haptic feedback) can be similarly associated.

The doubletriple keyboard and doubletriple keyboard system are able to achieve these improved results by allowing the user to generate a character with a sequence of two or three taps and reducing the number of keys displayed.

Many current keyboards used with mobile devices (for example, the virtual/software keyboard provided by default with APPLE or ANDROID devices, typically divide the keyboard in two parts: the keys which are in four rows and a prediction line which appears above the keys. The prediction line is dynamic and presents in general three words which are the predictions of the words that the user likely will type next.

The doubletriple keyboard divides the keyboard in two parts: the keys which are in two rows (an upper and lower row—or also referred to as the first and second row) and a result bar which appears above the keys. The result bar is dynamic and presents one word which is a prediction of the word that the user will type next. In overview, the DKS operates by presenting larger and more easily selectable keys by limiting the number of keys needing to be presented to the user at any one time by presenting keys in sequential levels instead of the typical number of (e.g., 4) rows of keys. The two rows that are presented at any time contain the letters or symbols keys in the first row and the control characters (including punctuation) in the second row. The maximum number of keys presented in the first row ranges from three to six and this number is selectable by the user according to the level of visual impairment. If the maximum number of keys selected is five or six, then all of the keys present in the language (e.g., for most Latin based languages) are able to be divided and presented in two levels and two taps are necessary to generate a single character. If the maximum number of keys selected is three or four then all the keys present in the language will be divided into three levels and three taps are necessary to generate a single character. The division of the keys between levels is done alphabetically so that the user will know on which key to press at an upper (e.g., first) level in order to discover the next sequence of the next lower level. This keyboard enhancement enables a user to have much larger and visible keys at the same time as knowing how many key presses (taps) are needed to enter an input character.

For example, in a configuration with a maximum of six keys in the first row and using the English language as the designated language (as can be seen in FIG. 1), the twenty-six (26) characters of the alphabet are divided in six groups. In one example implementation of the doubletriple keyboard as shown in FIG. 1, the English alphabet is divided alphabetically into an upper level containing the characters "a", "e","i","m","q","v". Each one of the upper level characters represents a group of characters that are not yet visible on the keypad and that are displayed when the user taps (e.g., selects, presses) on the upper level character. For example, if a user wants to generate the letter "s", the user taps on the letter "q" at the upper level because the letter "s" is between "q" and "v" in order in the alphabet of the language and therefore belongs to the group represented by "q". When the user taps on the "q" character at the upper level, the DKS will replace the characters of the first row with the second (or "next") level of characters represented by the "q", that is "q","r","s","t","u", and will set the doubletriple keyboard at the lower (next) level which is the level from which characters are transmitted by the DKS to the operating system. When the user taps on the "s," the DKS will transmit this tapped character to the operating system. Thus, the user knows two taps are needed to input any of the characters "q","r","s","t","u" represented by the first (highest) level "q" character.

Figure 13:
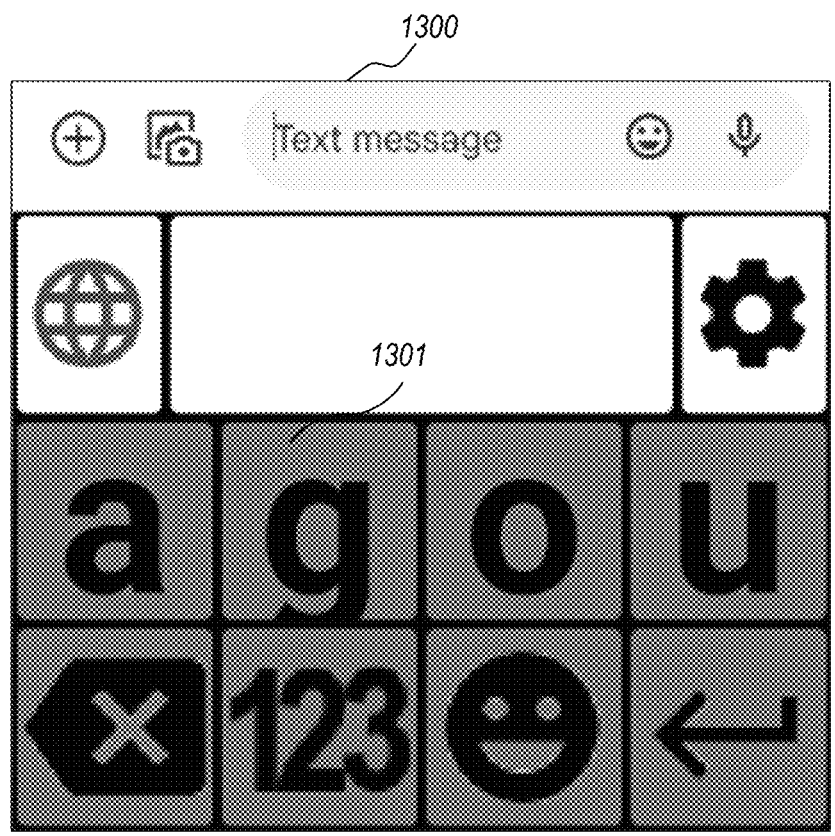
FIGS. 13-16 are example screen displays illustrating a sequence of typing of the letter "k" using an example doubletriple keyboard with four characters across the first row of selectable keys of the keyboard.

In another example, in a configuration with a maximum of four keys in the first row and using the English language as the designated language (as can be seen in FIG. 13) the 26 characters of the English alphabet are divided alphabetically into four groups at the upper level. In one example implementation of the doubletriple keyboard as shown in FIG. 13, the first row of the upper level consists of the letters "a","g","o","u". At the upper level the character "a" represents the group of characters "a" to "e", the character "g" represents "g" to "n", the character "o" represents "o" to "t" and the character "u" represents "u" to "z". In this configuration, the groups will be further divided in a middle level in order to limit the maximum number of characters to four per line. For example the group "o" to "t" is further divided in three groups and the letters representing these groups at the middle level are "o","q","s". In this configuration three taps are required and if a user wants to generate the letter "s", they will tap on "o" at the upper level, on "s" at the middle level and on "s" at the lower level. Thus, for any number of characters set by the user (3 through 6 ) in the upper level, the number of levels and which characters associated with a particular level can be determined based upon the designated language.

The doubletriple keyboard has several panes including letters, numbers, symbols and emojis. The way to generate a character is similar in all the panes. In the panes that do not represent letters, the upper level shows a symbol representative of the lower level. For example, when tapping on the $ sign on the upper level, the symbols of the currencies will appear at the lower level. When tapping on the heart emoji at the upper level, several types of heart emojis will appear at the lower level.

FIG. 1 is an example screen display of an example doubletriple keyboard system deployment. The doubletriple keyboard 100 of an example doubletriple keyboard system comprises a selectable key area 105 (e.g., a keyboard with two rows of user selectable keys) and a result bar 101, which appears above the keys. The selectable key area 105 includes six characters across the top row. The result bar includes a "globus" key 103 for language selection, a settings key (e.g., "gear" key) 102 for selection of various doubletriple keyboard settings, and a word prediction area 104. The operating system maintains a current input display area for keys typed in the keyboard (not shown in FIG. 1, see e.g., FIG. 10, input area 1000). All of the keys with a grey background in selectable key area 105 are control keys (in this doubletriple keyboard example the selected background color for control keys is grey) and taping on one of these keys will not result in a character being added to the input display area. All of the keys with a white background will cause a character (letter, punctuation, emoji, and the like) to be added to the input display area. Although the example is shown here using grey background as control keys and white background as selectable keys, other implementations may provide other designations using, color, patterns, and the like.

Figure 2:
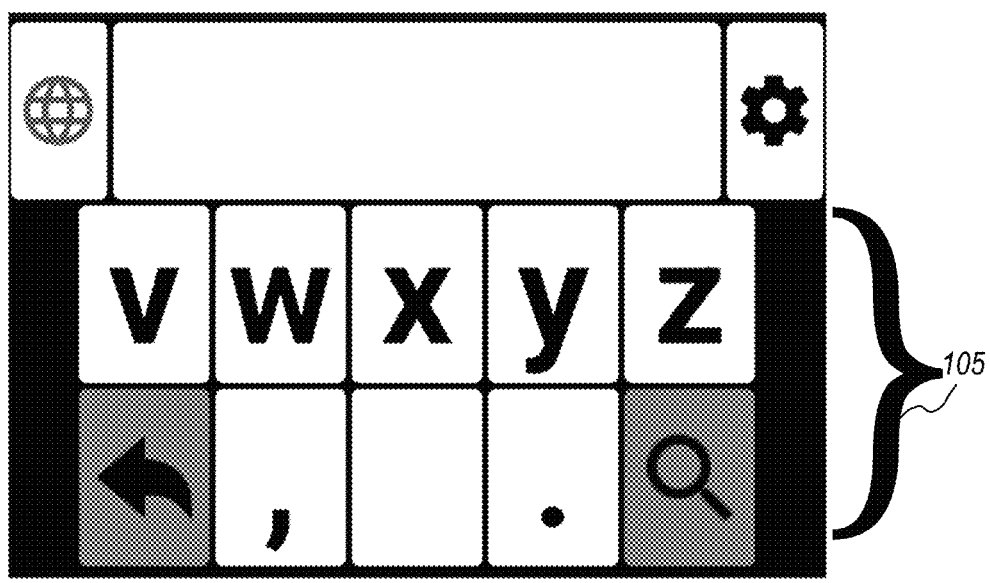
FIG. 2 is an example screen display of a lower level of an example doubletriple keyboard system deployment.

FIG. 2 is an example screen display of an a lower level of an example doubletriple keyboard system deployment. The screen shows five characters across the first row of the selectable key area (area 105 of FIG. 1) at the lower level when the user previously has tapped on the key "v" (key 110 in FIG. 1) at the upper level.

Figure 3A:
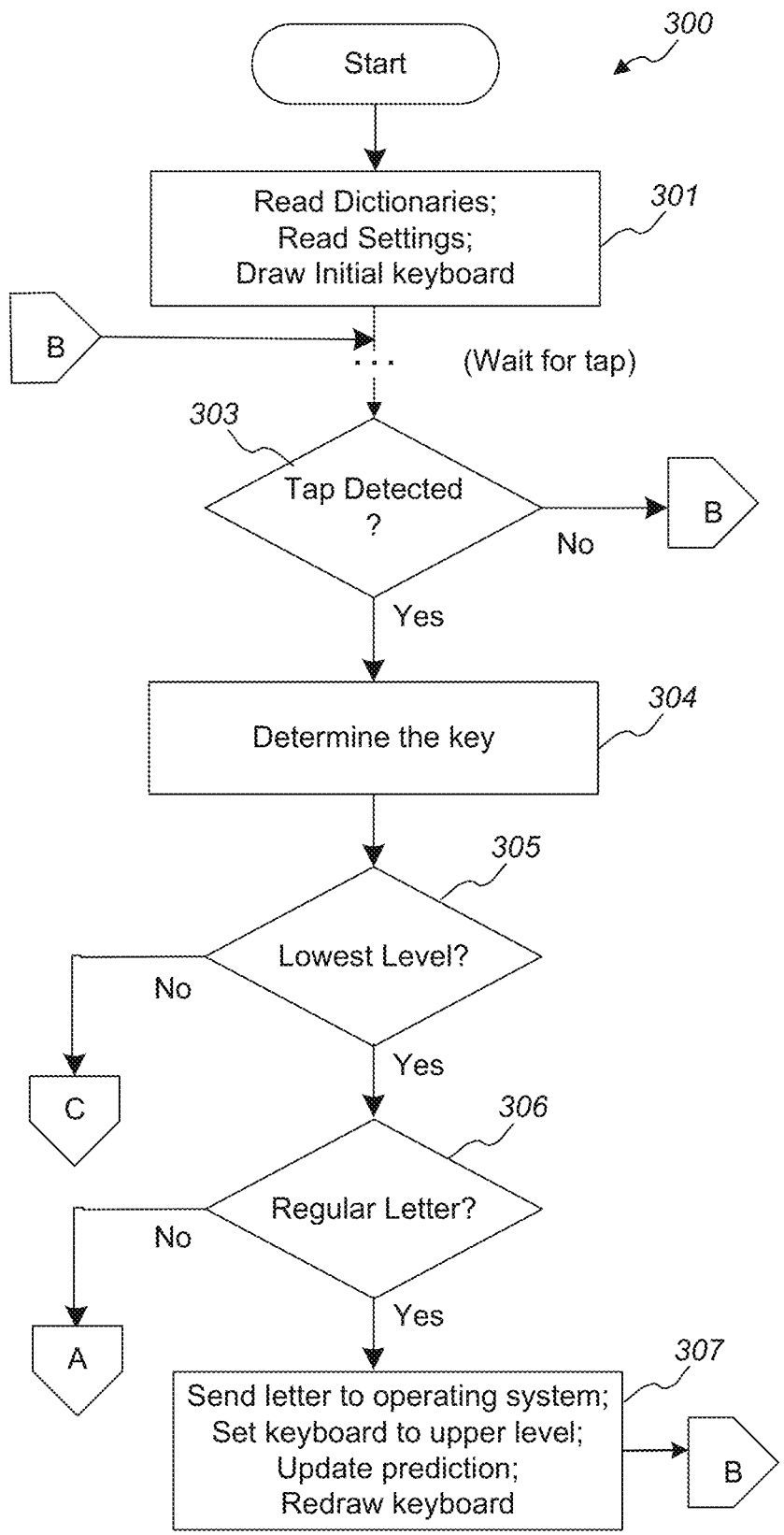
FIGS. 3A and 3B are an example flow diagram of overview logic flow of an example doubletriple keyboard processing system.
Figure 3B:
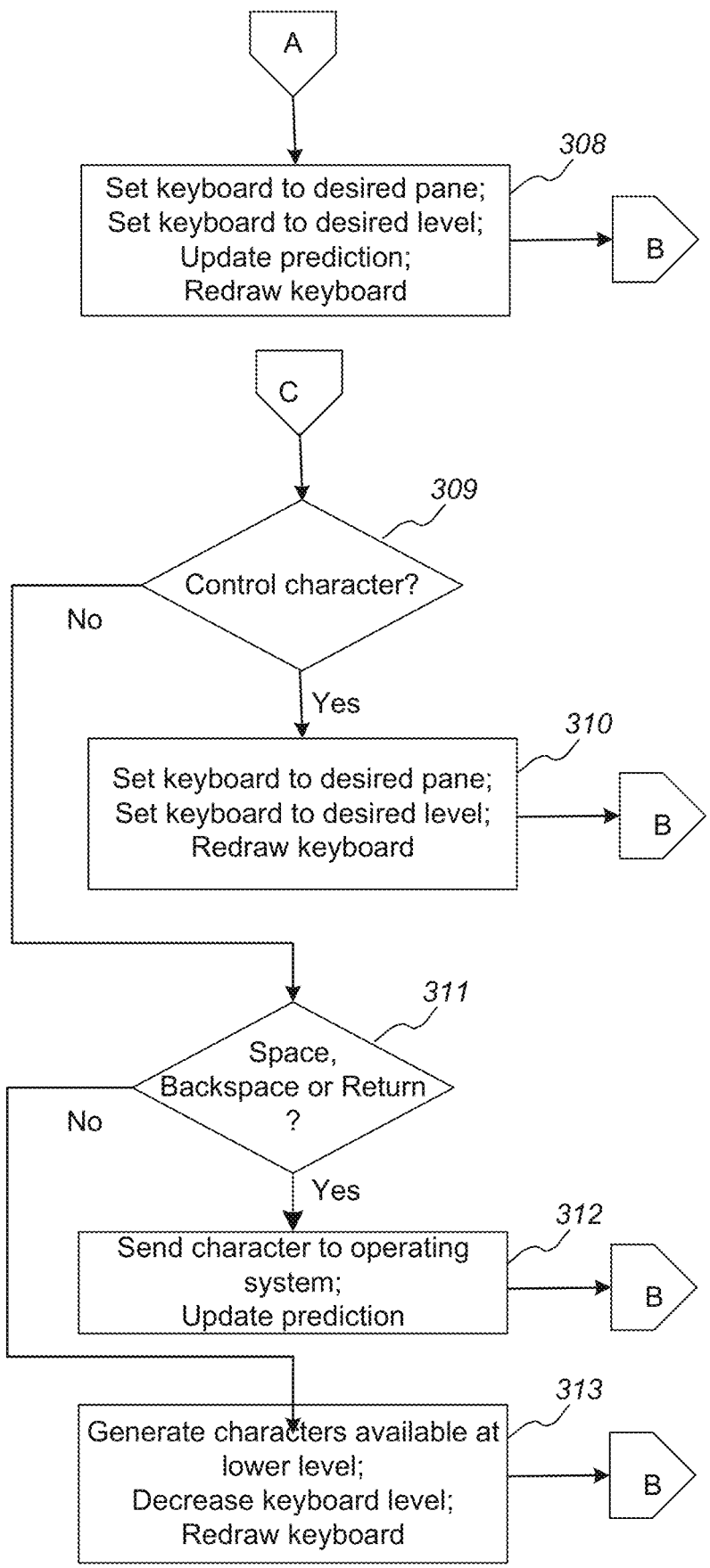

FIGS. 3A-3B are an example block diagram of overview logic flow of an example doubletriple keyboard processing system. In overview, in block 301, the DKS reads the designated dictionaries, the settings, and draws an initial keyboard. It also 'hooks' into the keyboard and mouse (I/O drivers) events of the operating system to be able to receive notice of keyboard and mouse events. For example, using API in iOS and in Android operating systems, an application can declare itself as a keyboard. The user then can select the doubletriple keyboard instead of or in addition to the default system keyboard from the system settings interface.

The logic 300 then waits to receive (be notified of) a tap, and upon notification, proceeds to block 304 otherwise waits for the next key. In block 304, the logic determines what key was pressed.

In block 305, the logic checks if the keyboard was at its lowest level. The lowest level is determined if the user has already tapped at least once on a key representing a collection of keys. One such key tap will bring the keyboard to the lowest level in the case of six or five keys across and two such taps in the case of four or three keys across. (The number of levels can also depend upon how many characters are part of the designated language.) If the keyboard is determined to be at the lowest level, the logic continues to block 306 otherwise it continues to block 309.

In block 306, the logic determines if a regular letter has been tapped. For the purposes of this description, a key on the doubletriple keyboard generally corresponds to a letter or a character, including alphanumeric input, numbers, symbols, emojis, images, or the like. The examples herein describe letters commonly used with a QWERTY keyboard on a mobile device, and may refer to these as "regular letters" (e.g., the symbols that correspond to the keys on the primary keyboard display). When a regular letter (alphabetically or equivalent for the designated language) is determined, the logic continues to block 307, otherwise if the key tapped was not a regular letter (but a control key) it continues to block 308.

In block 307, the logic sends the regular letter to the operating system for processing, updates the prediction word in the prediction area (e.g., area 104 in FIG. 1), sets the keyboard to the upper level, redraws the keyboard, and then returns to wait for the next key input (before block 303).

In block 308, the logic updates the prediction, sets the keyboard to the appropriate level, draws the requested pane such as numeric input display, an emoji input display, etc., and then returns to wait for the next key input (before block 303).

In block 309, the logic determines whether a control character has been selected, and if so continues in block 310 to draw the requested pane such as numeric input display, an emoji input display, etc., to set the appropriate level and then returns to wait for the next key input (before block 303). If not, the logic continues to determine the input key in block 311.

In block 311, the logic determines whether the selected character is a space, a backspace or a return and if so transmits the selected character to the operating system, updates the prediction and then returns to wait for the next key input (before block 303). If not, the logic continues to block 313.

In block 313, the logic determines the characters available at the lower level according to the key that was found in block 304, it decreases the keyboard level, redraw the keyboard with the available characters and then returns to wait for the next key input (before block 303).

The DKS implements several operating system methods (not shown) in order to handle certain types of keyboard events that may be first detected by the operating system. Keys such as a Return key or a Send (arrow) key may trigger end of input processing. For example, when an end of input is determined by the Android operating system, it calls the method OnFinishInput( )in order to handle end of input processing. The DKS implementation of this method (e.g., OnFinishInput( ) handles the end of a input by cleaning up all internal structures in order to be able to start typing a new input.

The DKS system also implements a method to determine when/whether to remove the keyboard. For example, in the Android operating system, the DKS implements the method OnDestroy( )to close the dictionary and settings files and then exits.

The techniques of a doubletriple keyboard and doubletriple keyboard system are generally applicable to any type of keyboard and language. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement a doubletriple keyboard that improves the ability of visually challenged users to type on mobile phones based on the increase in size of the letters and symbols shown on the keyboard. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Example doubletriple keyboard systems include four components: a settings engine, a dictionary engine, a keyboard engine (for processing the keyboard input), and a user interface for drawing the keyboard allocated to the DKS, for detecting input and coordinating input and resulting output between the user, the system user interface, and the keyboard engine. Each of these components is described and can be seen in a computing system in FIG. 17.

Settings Engine

Figure 17:
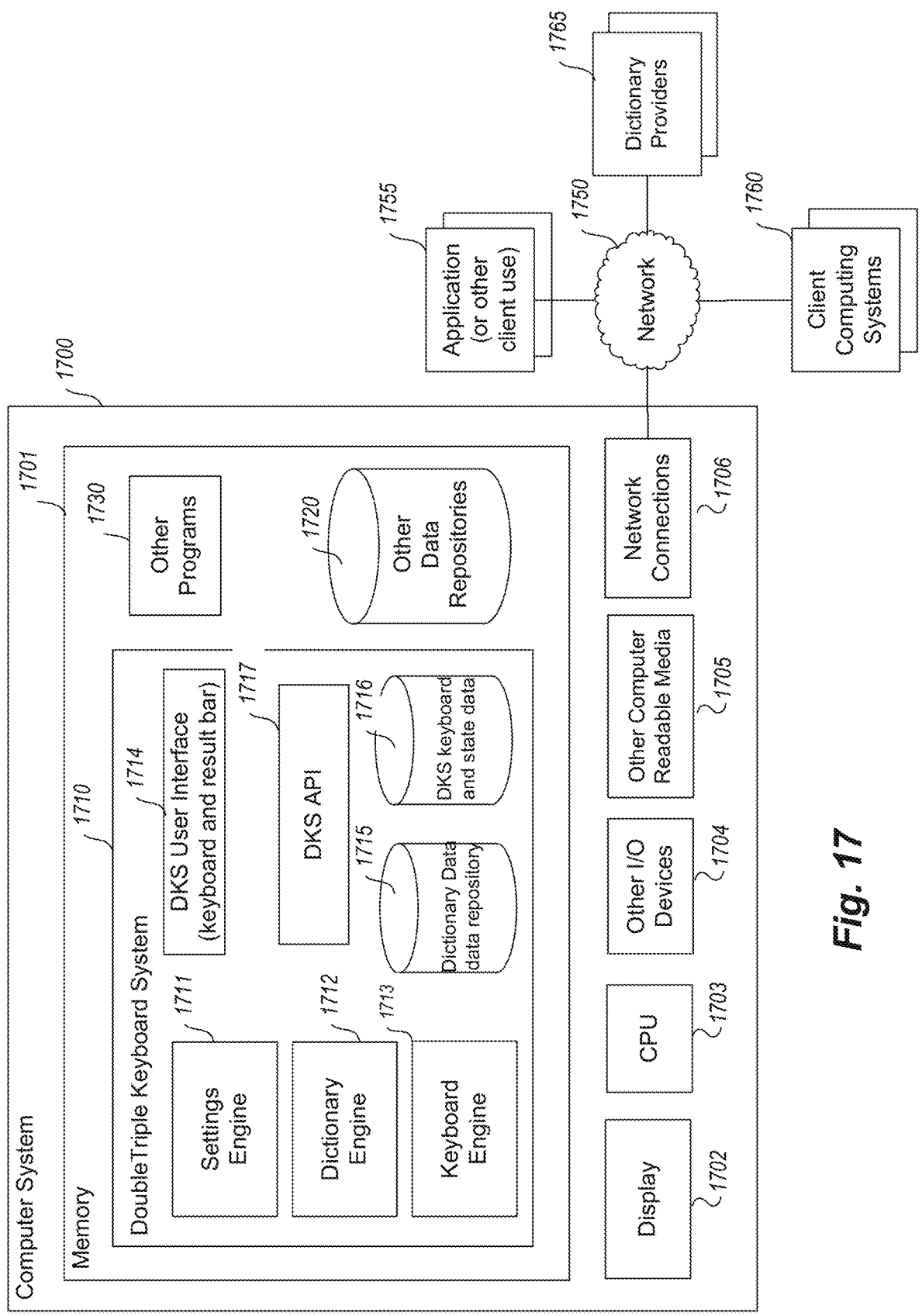
FIG. 17 is is an example block diagram of a computing system for practicing embodiments of an example doubletriple keyboard.

The Settings Engine 1711 is shown residing in an example computing system (e.g., a mobile device) in FIG. 17. When the doubletriple keyboard is initialized it will establish the initial settings. The initial settings screens (or user input controls) allow the program to determine the keyboard layout, the languages file to use and to build the initial user dictionary.

Figure 4A:
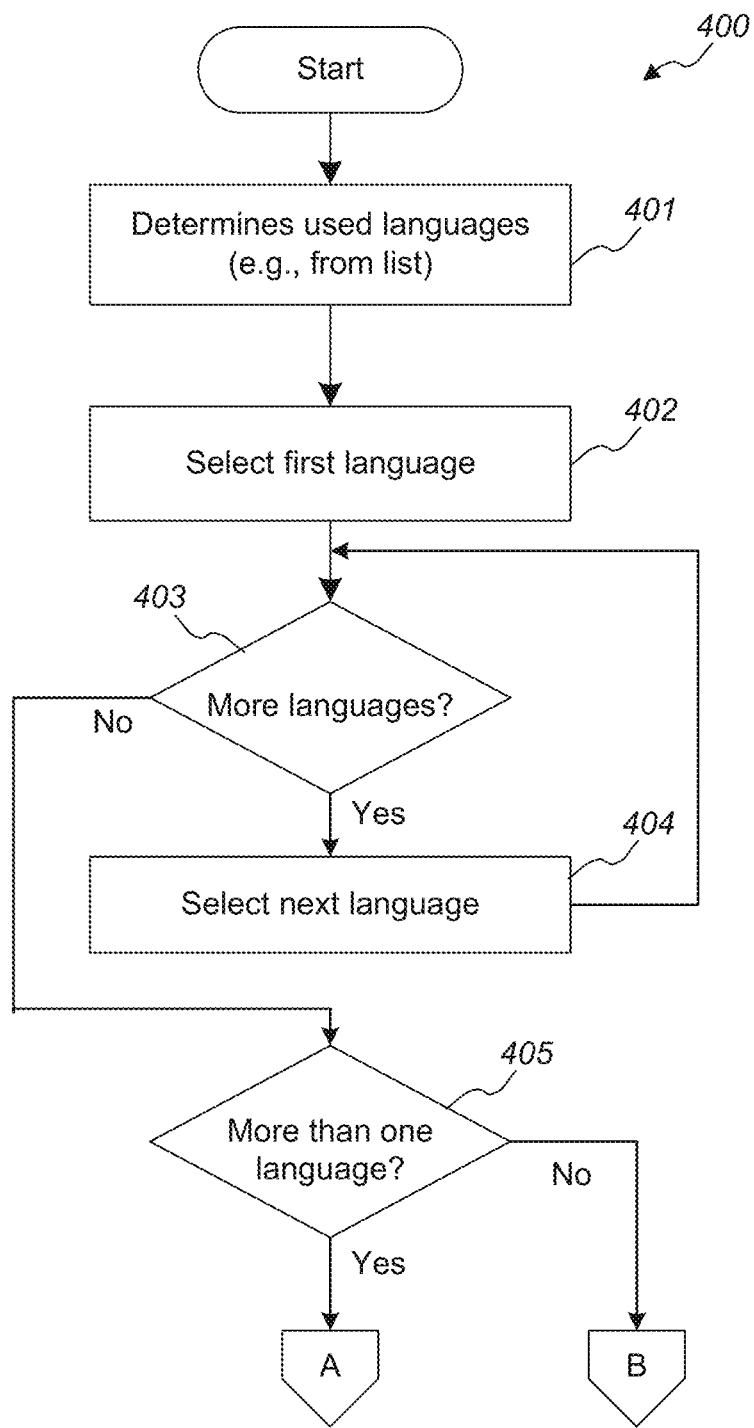
FIGS. 4A and 4B are an example flow diagram of processing initial settings on an example doubletriple keyboard.
Figure 4B:
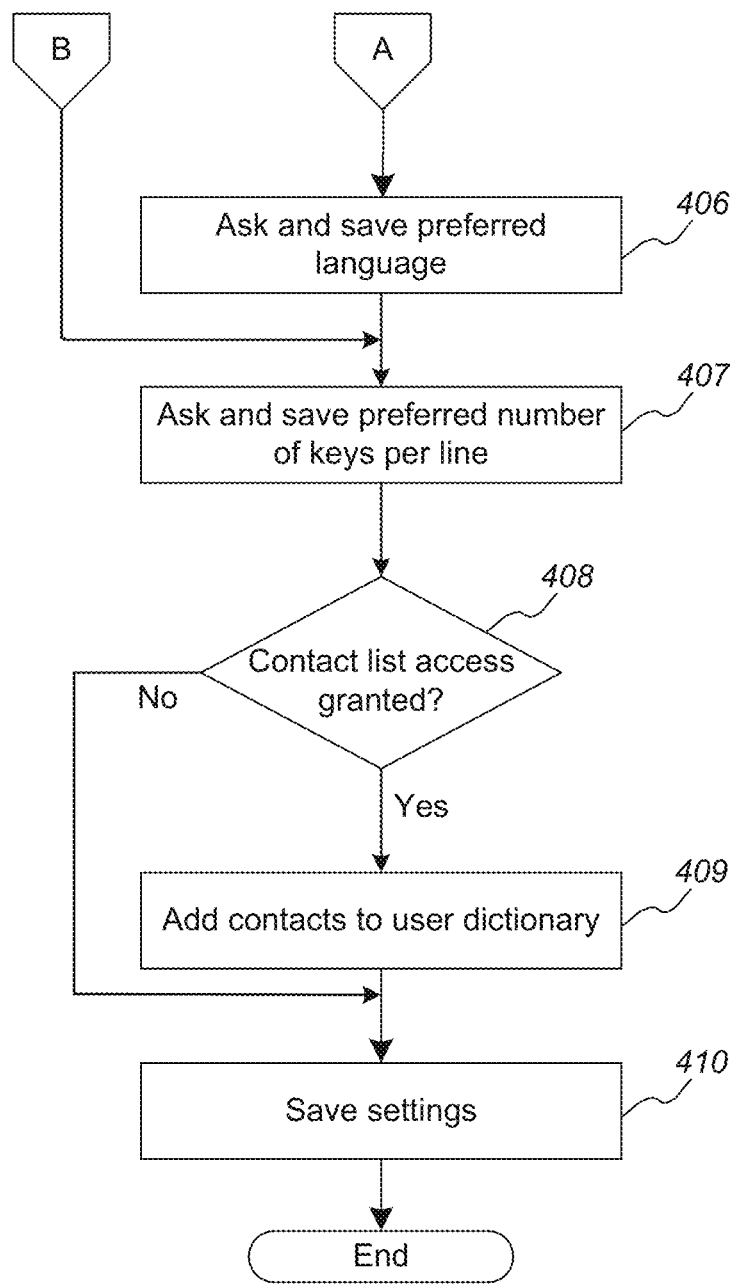

FIGS. 4A and 4B are an example flow diagram of processing initial settings on an example doubletriple keyboard. In block 401, the logic determines the languages (from a system list) used in the system. In block 402, the logic selects the first language to add to the list of languages known by the user. Blocks 403-404 implement a loop performed by each such language. In block 403, the logic determines whether there are additional languages to process and if so proceeds to block 404 to select the next known language and add it to the user list; otherwise, continues in block 405. In block 405, the logic determines whether more than one language was selected and if so proceeds to block 406 to query and save the user's preferred language; otherwise, continues in block 407. In block 407, the logic queries and save the preferred number of keys to be displayed in a single row of the keyboard. In block 408, the logic determines whether the user has granted access to the user's contact list and if so in block 409 adds the user's contacts to the user dictionary, and continues in block 410; otherwise, the logic continues in block 410. In block 410, the logic saves the determined settings and exits.

FIGS. 5-9 illustrate example screen displays of additional settings available to a user to turn on the various improved capabilities described above for a doubletriple keyboard. These additional settings are selected by tapping on the settings icon 102 located in the result bar 101 as shown in FIG. 1. When settings icon 102 is selected, a settings window is opened. The settings are used to allow the DKS to control the display of the rows of keys (e.g. 105 in FIG. 1) and of the result bar (e.g., 101 in FIG. 1). The settings allow a user to control how the improvements overviewed above will be presented. For example, these settings allow control and association of colors, key sizes, and sound feedback. They also allow the addition of to other languages.

When settings are changed by the user, the current settings window passes the changes to the user interface engine which passes these changes to the keyboard engine which is responsible to save them in a file and to generate a redraw action as necessary. Other additional settings can be incorporated similarly.

Figure 5:
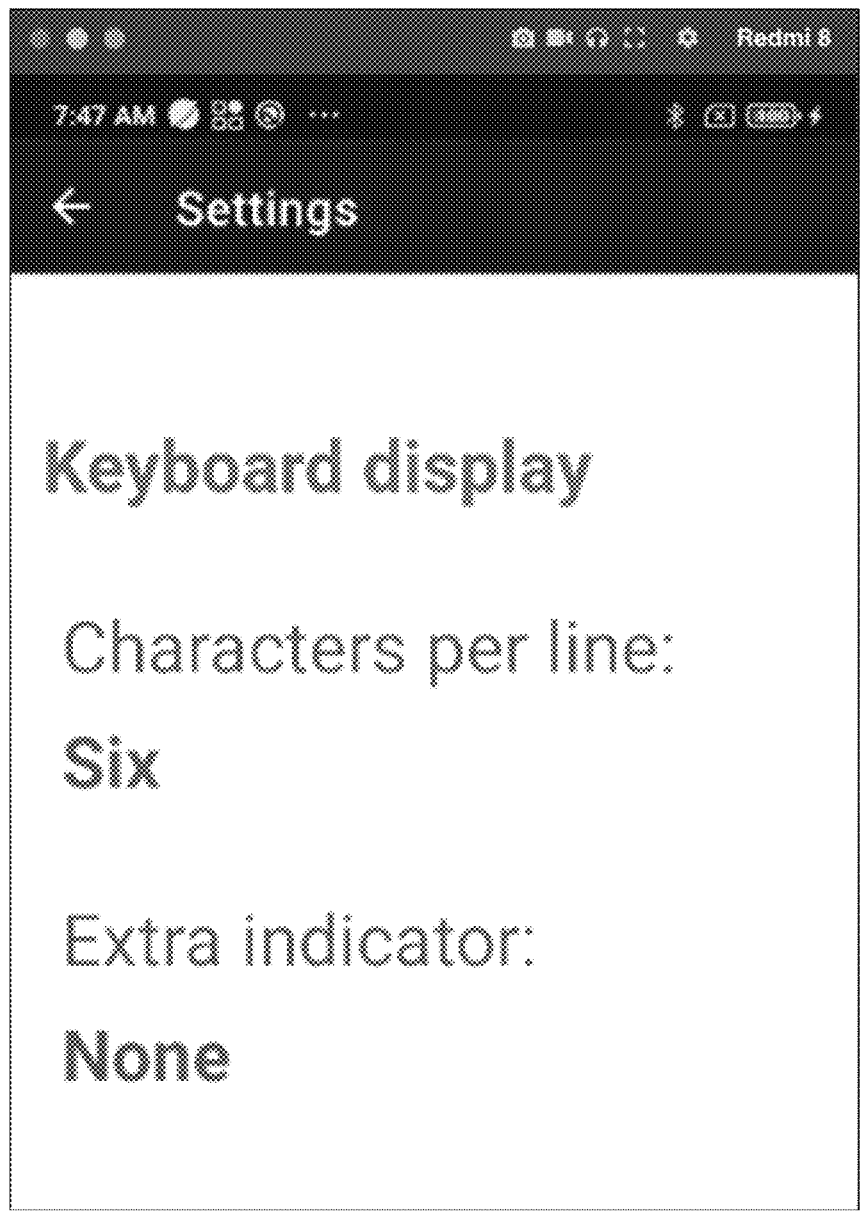
FIG. 5 is an example screen display of keyboard display settings on an example doubletriple keyboard.

FIG. 5 is an example screen display of keyboard display settings on an example doubletriple keyboard. This display can be used to select the size of the keys and to add an additional character to the keys in the top row of the selectable key area as an indication to the user that the keyboard is not at the lowest level.

Figure 6:
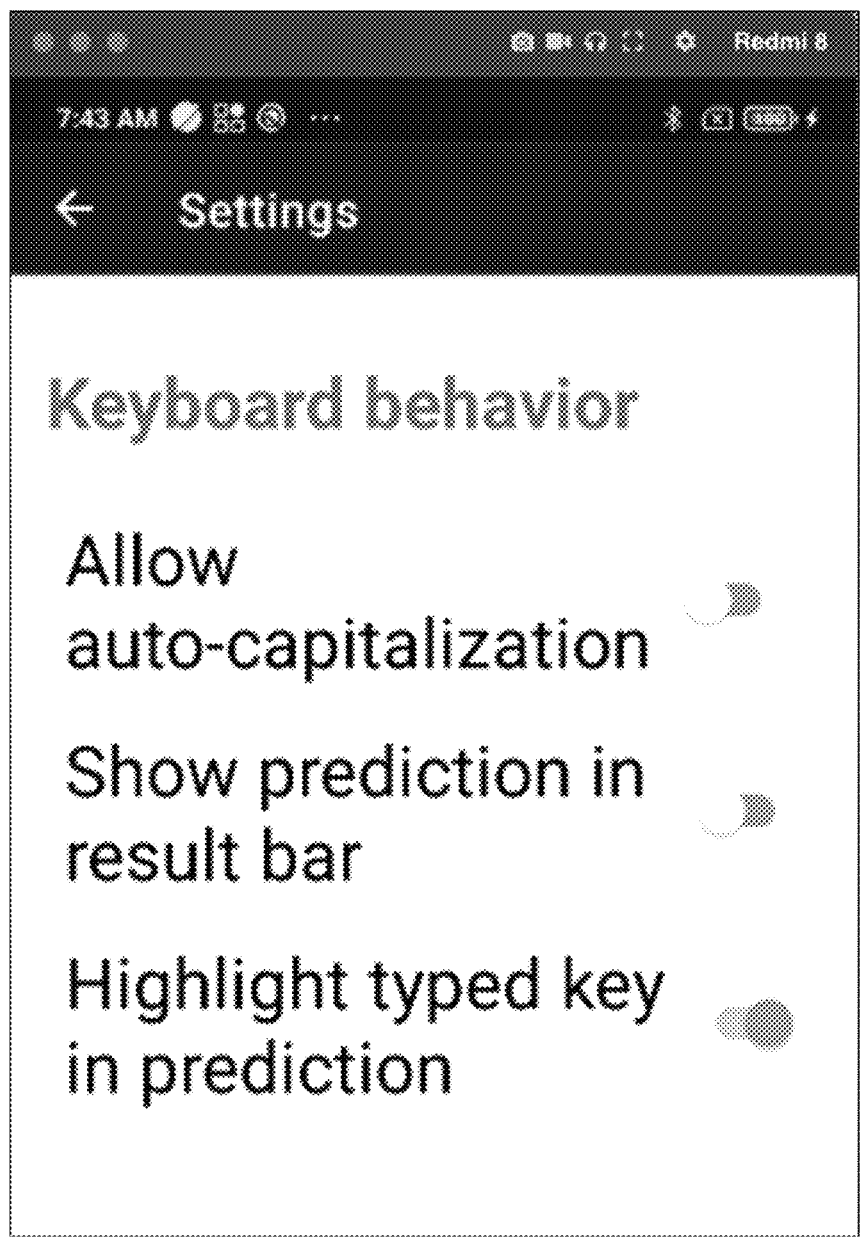
FIG. 6 is an example screen display of keyboard behavior settings on an example doubletriple keyboard.

FIG. 6 is an example screen display of keyboard behavior settings on an example doubletriple keyboard. This display can be used to turn on and off auto-capitalization, appearance of a prediction in the result bar and highlighting the typed key in the prediction in the result bar.

Figure 7:
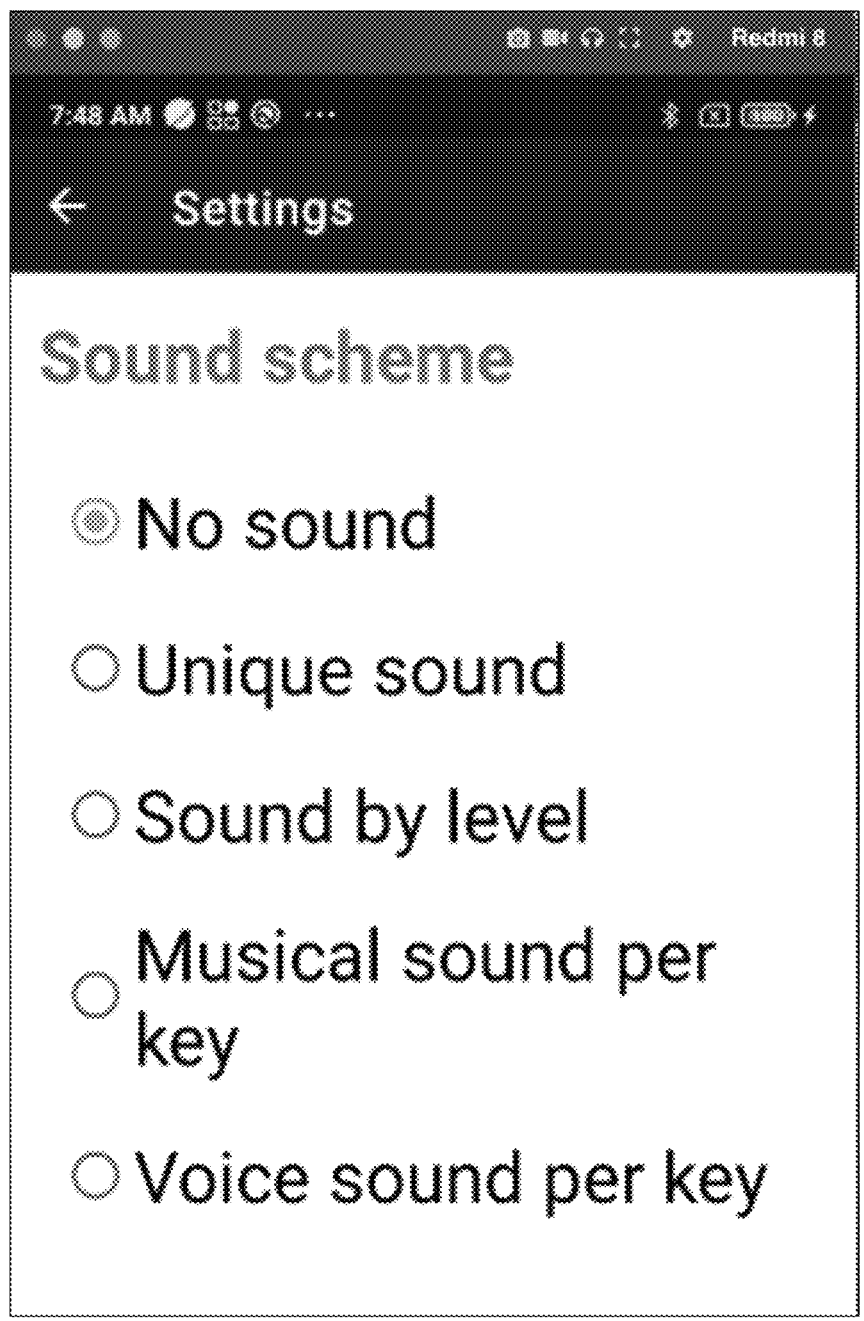
FIG. 7 is an example screen display of sound settings on an example doubletriple keyboard.

FIG. 7 is an example screen display of sound settings on an example doubletriple keyboard. This display can be used to control sound associated with any key.

Figure 8:
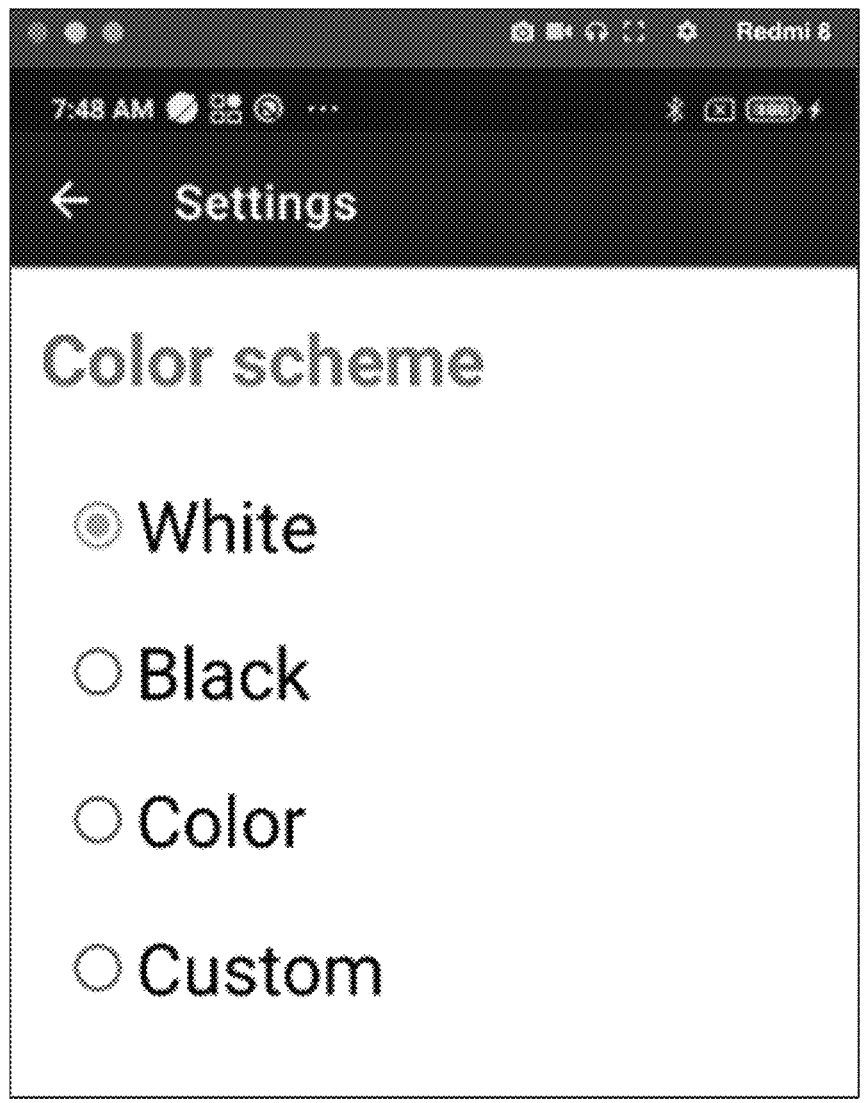
FIG. 8 is an example screen display of color settings on an example doubletriple keyboard.

FIG. 8 is an example screen display of color settings on an example doubletriple keyboard.

Figure 9:
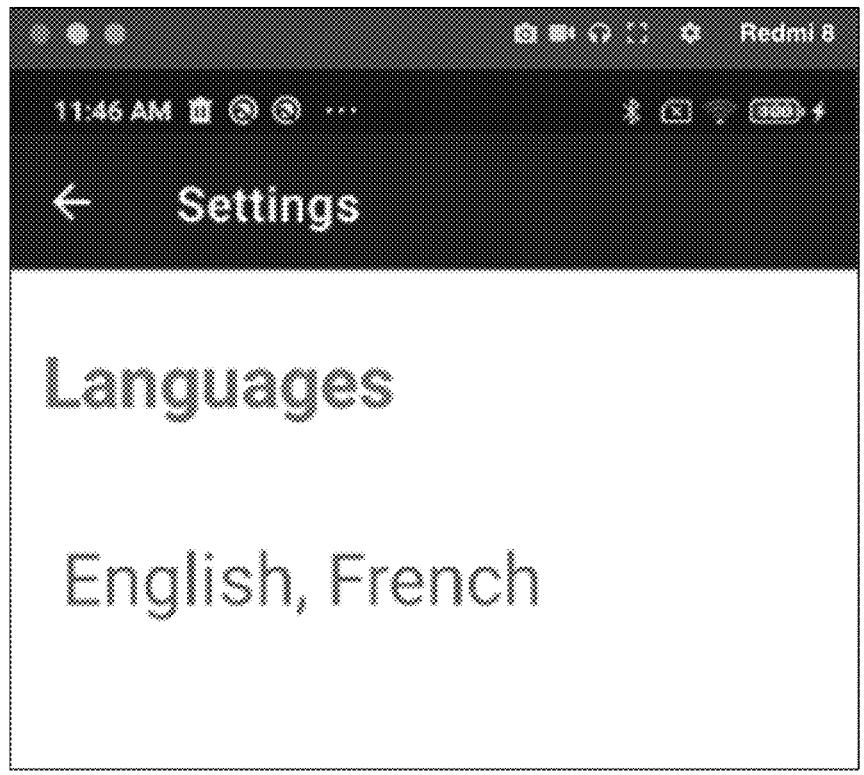
FIG. 9 is an example screen display of languages settings on an example doubletriple keyboard.

FIG. 9 is an example screen display of languages settings on an example doubletriple keyboard.

The Dictionary Engine and the DKS Dictionaries

The Dictionary Engine 1712 and dictionary data 1715 are shown residing in an example computing system (e.g., a mobile device) in FIG. 17. For each language supported by the doubletriple keyboard, there is a data file that contains the language dictionary for that language. A language dictionary file used for DKS contains all the words of the dictionary for this language (it is a data structure that lists words). The words are arranged (preferably) in a compressed fast access trie structure that also contains additional information needed to support the prediction, and the auto-capitalization.

In an example embodiment, a DKS dictionary (list of valid words) is ordered by the frequency of the usage of the word in the language, and include additional information for generating predictions. Dictionaries and information regarding word frequency for a particular language may be purchased, for example, from different online vendors such as "www.wordfrequency.info/intro.asp" (a resource for obtaining data from the Corpus of Contemporary American English (COCA)).

To optimize performance, the entire list can be compressed in a modified trie structure. (Other data structures may be similarly incorporated.) In addition, some DKS embodiments use a paging technique for reducing the memory footprint of the various dictionaries.

In addition to the language files that exist for each language, there is a single user dictionary file that is built using the initial settings and is updated when the user types a word that is not included in one of the language dictionaries and is not considered to be a typing error.

The dictionary engine is responsible for communicating the prediction and the capitalization to the keyboard engine.

When the dictionary engine receives a key from the keyboard engine its logic processes special keys (control keys, punctuation, backspace), determine the prediction, check if the word needs capitalization and passes the results back to the keyboard engine for further processing.

The Keyboard Engine

The Keyboard Engine 1713 is shown residing in an example computing system (e.g., a mobile device) in FIG. 17. The keyboard engine is responsible for computing the boundaries of all the elements that need to be drawn by the keyboard user interface based on the language and the layout from the settings. It is also responsible for determining which element of the keyboard user interface has been selected after the doubletriple keyboard user interface is notified of a key press from the underlying system (see block 304 in FIG. 3A).

The keyboard engine receives the coordinates of the user touch from the keyboard user interface module (which in some example deployments come from the underlying system), as well as the touch action (regular press or long press). Then, the keyboard engine uses the current keyboard layout data stored to establish the typed key and associated functions (e.g., changing pane or level) and sends the result back to the keyboard user interface module. The keyboard user interface module then provides the initial feedback of the typed key to the user.

In some embodiments the keyboard user interface module is provided as part of the DKS and obtains notification of user actions with the touch screen keyboard both as to location and duration from the underlying operating system. The DKS user interface then communicates the location and duration (e.g., detection of a long vs short press) to the keyboard engine. In other embodiments, the keyboard user interface module is provided by the underlying operating system and the DKS user interface functions are integrated into the operating system. Whichever, technique is used, once the system/DKS user interface has displayed the current input, it passes it to whichever application is associated with receiving keyboard input.

When a user taps on a key, the tap is transferred from the system/DKS user interface to the keyboard engine to determine the actual typed key (e.g., a "u"). The keyboard engine then passes this recognition (that the typed key is a "u") back to the user interface. If the user selects this typed key (e.g., by raising the user's finger), then the confirmation is sent back to the keyboard engine. If not, for example, if the user drags the user's finger to another area of the display (e.g., signaling cancelation of the action), then the key is ignored.

Upon determining a typed key, the keyboard engine checks if the keyboard was at its lowest level (e.g., level 2 or 3 depending upon the number of keys presented in the first row for the English language). If the typed key is not a control key and the keyboard was at its lowest level, then the keyboard engine passes the typed key to the dictionary engine which processes the typed key, and gives back a prediction and/or a directive for capitalization.

If the typed key was a control key, then the keyboard engine performs the necessary control action (e.g., a change of pane or a change of level) and ask the user interface module to redraw the keyboard.

If the typed key was a letter representing a group of letters, then the keyboard engine retrieves all the letters represented by the typed key, performs a change of level, and ask the user interface module to redraw a keyboard showing the retrieved letters.

The User Interface

The DKS User Interface 1714 is shown residing in an example computing system (e.g., a mobile device) in FIG. 17. As mentioned above, the keyboard user interface module may be provided by the underlying operating system or as part of the DKS or both. When starting the program, the user interface engine is responsible to pass the rectangle size of the keyboard area to the keyboard engine. Once this rectangle is passed, the keyboard engine can compute the boundaries of the various elements and pass them back to the user interface.

The DKS user interface will then draw the keyboard and the result bar according to the layout and the settings received from the keyboard engine.

After initialization, the DKS user interface is responsible for monitoring the user taps (e.g., presses, selections, etc.) and to pass the tap coordinates to the keyboard engine together with the tap action (short or long press). After passing the coordinate of the tap and the tap action to the keyboard engine, the DKS user interface will receive from the keyboard engine a result allowing it to update the current input display of the doubletriple keyboard and to pass the characters generated to the application requesting the services of the doubletriple keyboard (for example, via the system user interface). In some deployments, such as that described below with respect to FIGS. 10-16, the operating system user interface/application is responsible for updating the currently displayed input, as shown, for example, in currently displayed input area 1200 in FIG. 12.

Improved Keyboard Functions

The doubletriple keyboard user interface of the doubletriple keyboard implements the improvements overviewed above including large and extra-large keys by implementing a multi-level key display.

Figure 10:
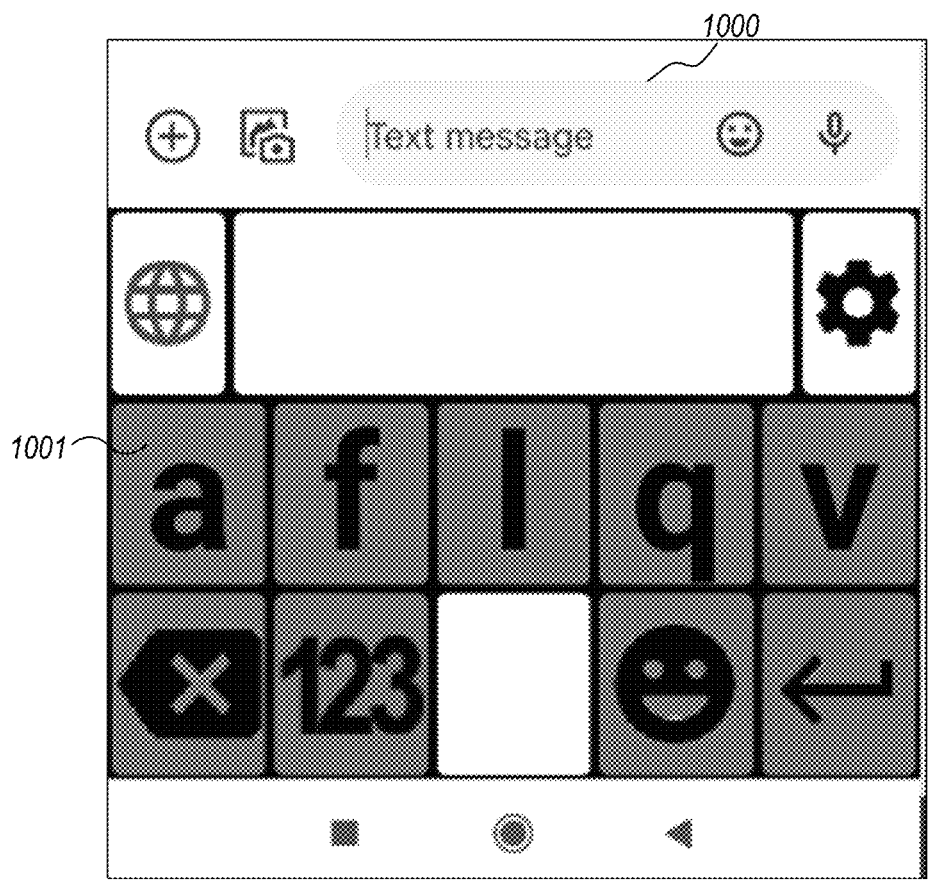
FIGS. 10-12 are example screen displays illustrating a sequence of typing of the letter "e" using an example doubletriple keyboard with five characters across the first row of selectable keys of the keyboard.
Figure 11:
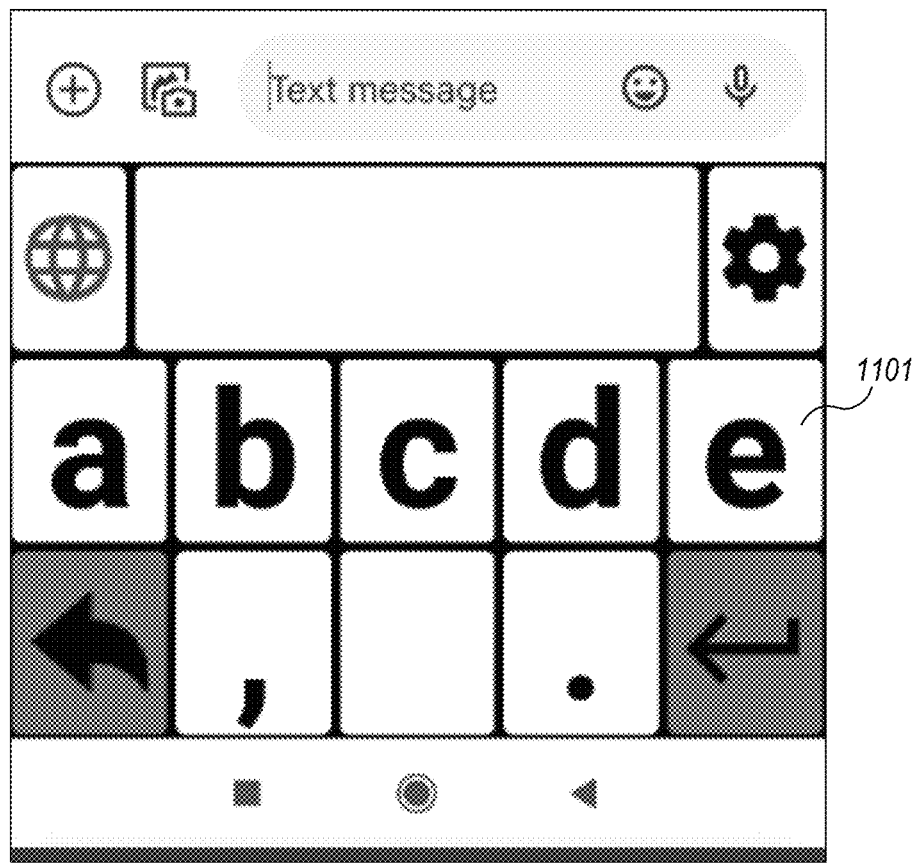
Figure 12:
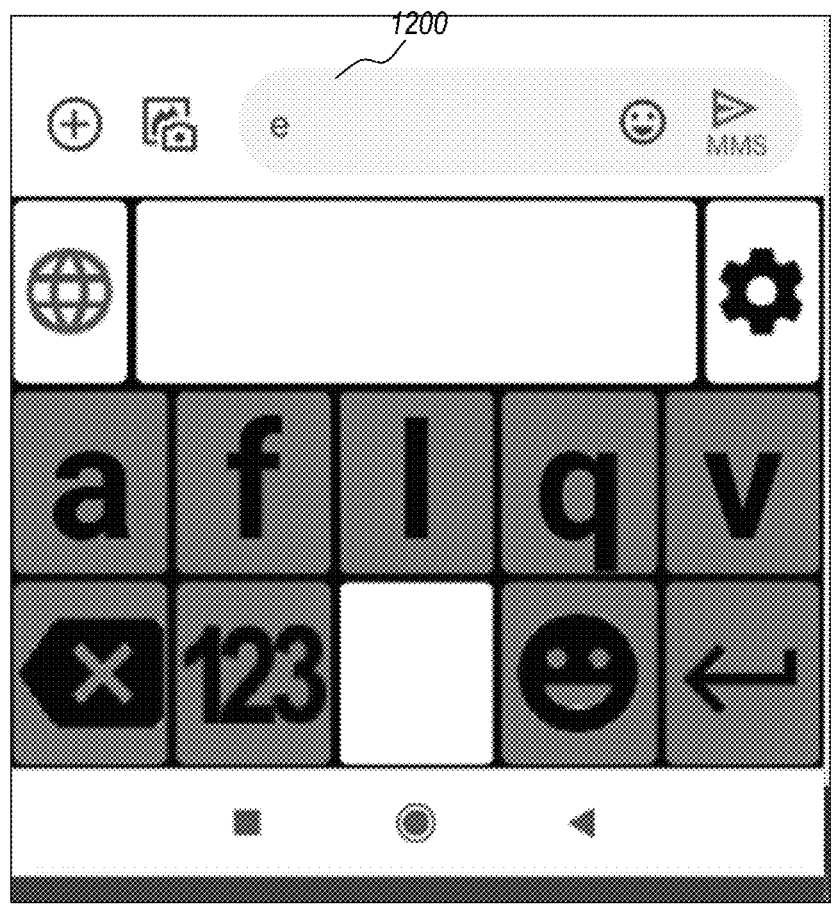

FIGS. 10-12 are example screen displays illustrating a sequence of typing of the letter "e" using an example doubletriple keyboard with five characters across the first row of selectable keys of the keyboard. In FIG. 10 the display screen shows the upper "level" of the keyboard and it displays the characters "a", "f", "l", "q" and "v" in the first row of user selectable keys at this level. In FIG. 11 the display screen shows the lower level of the keyboard that is reached when the user has tapped on the "a" (key 1001 in FIG. 10) at the upper level. In FIG. 11 the first row of user selectable keys is "a", "b", "c", "d", "e" and, at this (lower) level, the character represented by the key that is typed is transmitted to the operating system user interface/application. In FIG. 12 it can be seen that the character "e" typed in FIG. 11 (key 1101) now appears in the display input area 1200 and the keyboard is reset (and redisplayed) at the upper level to be ready for a new input. One can see that the characters "a", "f", "l", "q" and "v" in the first row of user selectable keys are again shown in the display area.

Figure 14:
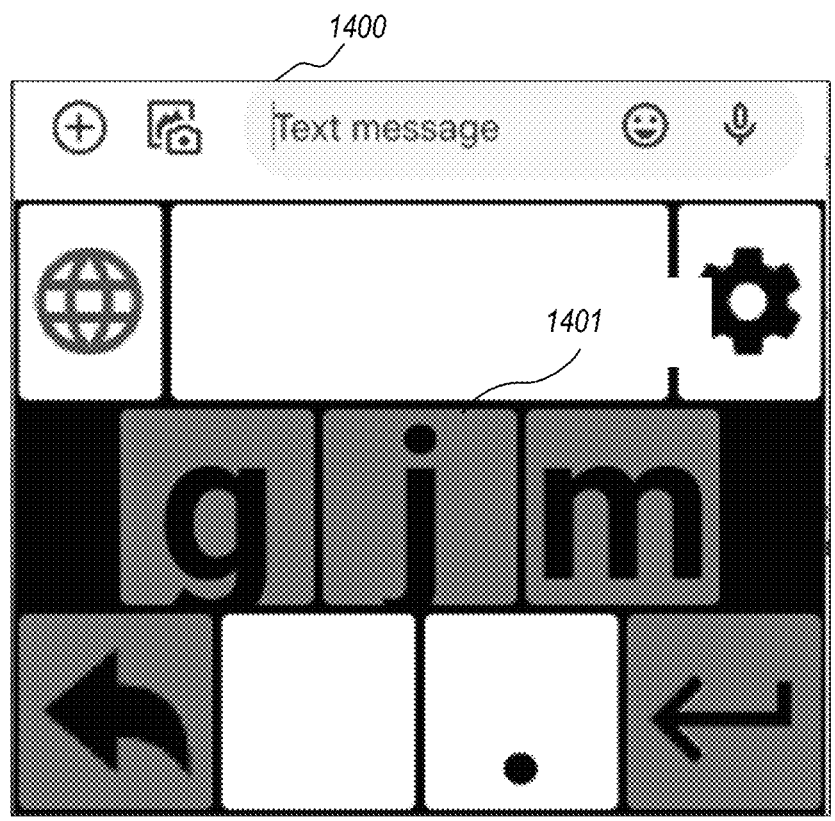
Figure 15:
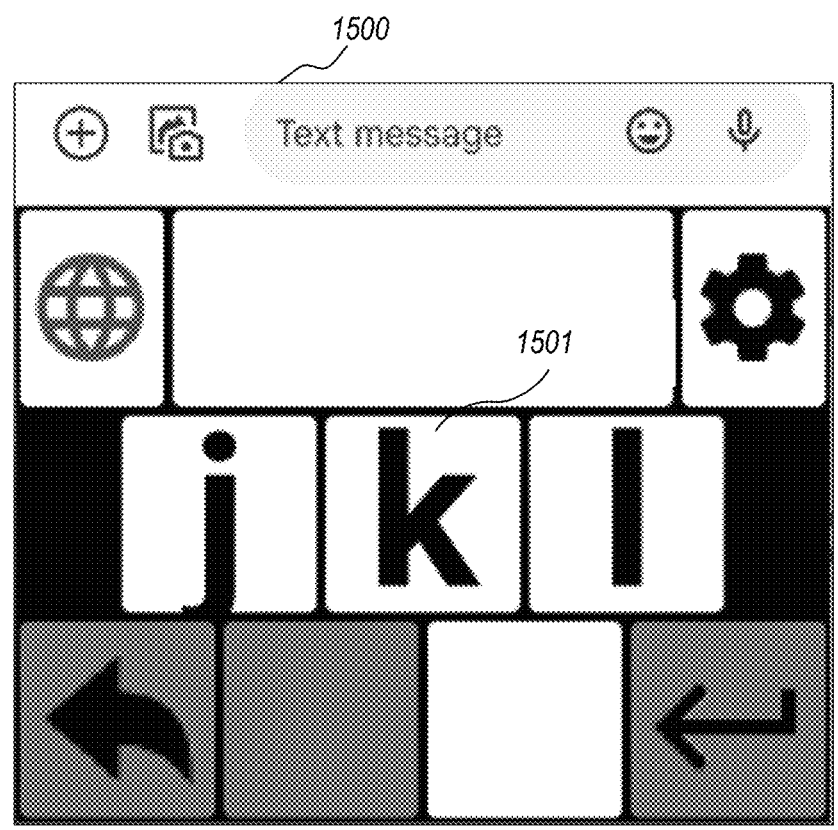
Figure 16:
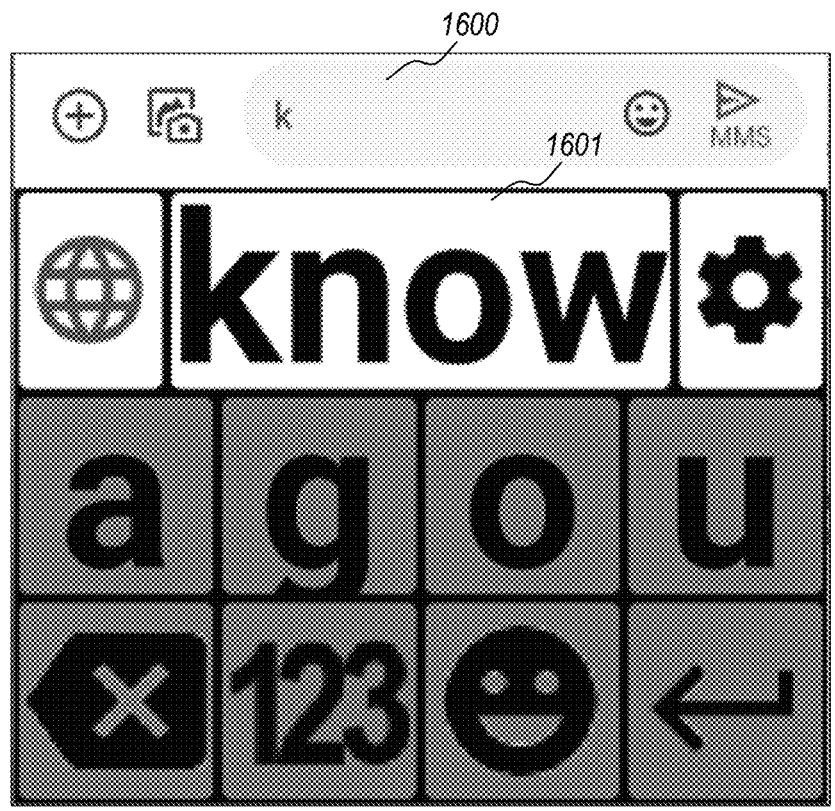

FIGS. 13-16 are example screen displays illustrating a sequence of typing of the letter "k" using an example doubletriple keyboard with four characters across the first row of selectable keys of the keyboard. In FIG. 13 the screen shows the upper level of the keyboard and it displays the characters "a", "g", "o", and "u" in the first row of user selectable keys at this level. In FIG. 14 the screen shows the second level of the keyboard that is reached when the user has tapped on the "g" at the upper level (key 1301 in FIG. 13). In FIG. 14 the first row of user selectable keys is "g", "j", "m". In FIG. 15 the screen shows the lower level (the third level here) of the keyboard that is reached when the user has typed "j" on the second level (key 1401 in FIG. 14). In FIG. 15 the first row of user selectable characters is "j", "k", "l" and at this level the character typed is transmitted to the operating system user interface/application. In FIG. 16 the character typed was "k" (key 1501 in FIG. 15) and it now appears in the display input area 1600, the predicted word is "know" and it appears in the word prediction area 1601 and the keyboard is reset to the upper (first) level and is ready for a new input.

Example Computing Systems

FIG. 17 is an example block diagram of a computing system for practicing embodiments of an example doubletriple keyboard described herein. Note that one or more general purpose virtual or physical computing systems suitably instructed or a special purpose computing system may be used to implement an Doubletriple keyboard system ("DKS"). Further, the DKS may be implemented in software, hardware, firmware, or in some combination to achieve the capabilities described herein.

Note that one or more general purpose or special purpose computing systems/devices may be used to implement the described techniques. However, just because it is possible to implement the doubletriple keyboard on a general purpose computing system does not mean that the techniques themselves or the operations required to implement the techniques are conventional or well known.

The computing system 1700 may comprise one or more server and/or client computing systems and may span distributed locations. In addition, each block shown may represent one or more such blocks as appropriate to a specific embodiment or may be combined with other blocks. Moreover, the various blocks of the doubletriple keyboard system 1710 may physically reside on one or more machines, which use standard (e.g., TCP/IP) or proprietary interprocess communication mechanisms to communicate with each other.

In the embodiment shown, computer system 1700 comprises a computer memory ("memory") 1701, a display 1702, one or more Central Processing Units ("CPU") 1703, Input/Output devices 1704 (e.g., keyboard, mouse, CRT or LCD display, etc.), other computer-readable media 1705, and one or more network connections 1706. The DKS 1710 is shown residing in memory 1701. In other embodiments, some portion of the contents, some of, or all of the components of the DKS 1710 may be stored on and/or transmitted over the other computer-readable media 1705. The components of the doubletriple keyboard system 1710 preferably execute on one or more CPUs 1703 and manage the implementation of a doubletriple keyboard, as described herein. Other code or programs 1730 and potentially other data repositories, such as data repository 1706, also reside in the memory 1701, and preferably execute on one or more CPUs 1703. Of note, one or more of the components in FIG. 17 may not be present in any specific implementation. For example, some embodiments embedded in other software may not provide means for user input or display.

In a typical embodiment, the DKS 1710 includes one or more settings engines 1711, one or more dictionary engines 1712, one or more keyboard engines and one or more DKS user interfaces 1714. In at least some embodiments, the dictionary engine is provided external to the DKS and is available, potentially, over one or more networks 1750. Other and /or different modules may be implemented. In addition, the DKS may interact via a network 1750 with application or client code 1755 that uses results computed by the DKS 1710, one or more client computing systems 1760, and/or one or more third-party information provider systems 1765, such as purveyors of dictionary information used in dictionary data repository 1715. Also, of note, the DKS keyboard and state data repository 1716 may be provided external to the DKS as well, for example accessible over one or more networks 1750.

In an example embodiment, components/modules of the DKS 1710 are implemented using standard programming techniques. For example, the DKS 1710 may be implemented as a "native" executable running on the CPU 103, along with one or more static or dynamic libraries. In other embodiments, the DKS 1710 may be implemented as instructions processed by a virtual machine. In general, a range of programming languages known in the art may be employed for implementing such example embodiments, including representative implementations of various programming language paradigms, including but not limited to, object-oriented, functional, procedural, scripting, and declarative.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces 1717 to the data stored as part of the DKS 1710 (e.g., in the data repositories 1715 and 1716) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repositories 1715 and 1716 may be implemented as one or more database systems, file systems, or any other technique for storing such information, or any combination of the above, including implementations using distributed computing techniques.

Also the example DKS 1710 may be implemented in a distributed environment comprising multiple, even heterogeneous, computer systems and networks in some embodiments. Different configurations and locations of programs and data are contemplated for use with techniques of described herein. In addition, the server and/or client may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an DKS.

Furthermore, in some embodiments, some or all of the components of the DKS 1710 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FP-GAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of the invention. For example, the methods and systems for implementing a doubletriple keyboard discussed herein are applicable to architectures other than an IOS or ANDROID architecture. Also, the methods and systems discussed herein are applicable to differing application and operating system specific protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a computing system for implementing a keyboard that facilitates text entering by a visually challenged user, comprising:
   presenting in a selectable key area a first plurality of selectable keys, each key corresponding to a first collection of letters or character keys present in a designated language, wherein the first collection represents a plurality of placeholders for a second collection of letters or characters keys, at least some of which are not presented in the first plurality of selectable keys;
   receiving indication of a first user selected key from the first plurality of selectable keys displayed in the selectable key area, and presenting in the selectable key area a second plurality of selectable keys as a next level key sequence, each key each key in the next level key sequence corresponding to a letter or character key present in a designated language, wherein the first plurality of selectable keys is different than the second plurality of selectable keys;
   receiving indication of a second user selected key from the second plurality of selectable keys displayed in the selectable key area;
   determining whether the second user selected key is a lowest level key sequence;
   when it is determined that the second user selected key is the lowest level key sequence, concatenating the indicated second key to keystrokes previously received from the user to form a current input; and displaying the current input in a current input display area; and
   when it is determined that the second user selected key is not the lowest level key sequence, presenting in the selectable key area a third plurality of selectable keys as a next level key sequence, wherein the second collection represents a second plurality of placeholders for a third collection of letters or character keys.

2. The method of claim 1 wherein the designated language comprises an alphabet, and wherein the alphabet of the designated language is divided in successive groups of alphabetically ordered sequences of keys and wherein each ordered sequence is represented by a first key of the ordered sequence and represents a placeholder in the first plurality of placeholders or in the second plurality of placeholders.

3. The method of claim 1 wherein the method implements a software keyboard.

4. The method of claim 1 wherein the method is used in association with a physical hardware keyboard.

5. The method of claim 1, further comprising providing auditory feedback upon receiving the indication of the first user selected key.

6. The method of claim 5, further comprising providing auditory feedback upon receiving the indication of the second user selected key.

7. The method of claim 5 wherein the auditory feedback comprises a sound of a corresponding character represented by the first user selected key.

8. The method of claim 1, further comprising providing haptic feedback when indication of a user selected key is received.

9. The method of claim 1, further comprising associating a color with each displayed selectable key.

10. The method of claim 1, wherein the keyboard comprises exactly two selectable key areas, and wherein the presenting in the selectable key area a first plurality of selectable keys, each key corresponding to a first collection of letters or character keys present in a designated language, wherein the first collection represents a plurality of placeholders for a second collection of letters or characters keys, at least some of which are not presented in the first plurality of selectable keys further comprises:

presenting in a first selectable key area a first plurality of selectable keys, each key corresponding to a first collection of letters or character keys present in a designated language, wherein the first collection represents a plurality of placeholders for a second collection of letters or characters keys, at least some of which are not presented in the first plurality of selectable keys; and presenting in a second selectable key area a fourth plurality of selectable keys corresponding to a fourth collection of letters or character keys, wherein the fourth collection represents a fourth plurality of placeholders for a fifth collection of letters or characters keys, at least some of which are not presented in the fourth plurality of selectable keys.

11. The method of claim 10 wherein the fourth collection of letters or character keys comprises at least one of emojis, punctuation, or control keys.

12. A computing system configured to implement a software keyboard structured to enable a visually challenged user to facilitate input of text, comprising:

a processor;
a memory;
a display; and
a logic component including user interface logic, display logic, dictionary logic, and rule logic stored in the memory, that is configured when executed on the processor to:

present in a selectable key area a first plurality of selectable keys, each key corresponding to a first collection of letters or character keys present in a designated language, wherein the first collection represents a plurality of placeholders for a second collection of letters or characters keys, at least some of which are not presented in the first plurality of selectable keys;

receive indication of a first user selected key from the first plurality of selectable keys displayed in the selectable key area, and present in the selectable key area a second plurality of selectable keys in a next level key sequence, each key in the next level key sequence corresponding to a letter or character key present in a designated language, wherein the first plurality of selectable keys is different than the second plurality of selectable keys; and receive indication of a second user selected key from the second plurality of selectable keys displayed in the selectable key area;

determine whether the second user selected key is a lowest level key sequence;

when it is determined that the second user selected key is the lowest level key sequence, concatenate the indicated second key to keystrokes previously received from the user to form a current input; and display the current input in a current input display area.

13. The system of claim 12 wherein the logic component implements a software keyboard.

14. The system of claim 12 wherein the logic component logic is used in association with a physical hardware keyboard.

15. The system of claim 12 wherein the logic component further comprises logic configured to provide auditory feedback upon receiving the indication of a user selected key.

16. The system of claim 15 wherein the auditory feedback comprises a sound of a corresponding character represented by the first user selected key.

17. The system of claim 12 wherein the logic component further comprises logic configured to provide haptic feedback upon receiving indication of a user selected key is received.

18. The system of claim 12 wherein the designated language comprises an alphabet, and wherein the logic component is structured to divide the alphabet of the designated language into successive groups of alphabetically ordered sequences of keys and wherein each ordered sequence is represented by a first key of the ordered sequence and represents a placeholder in the first plurality of placeholders.

19. The system of claim 12 wherein the logic component presents exactly two selectable key areas, and wherein the logic presents the first plurality of selectable keys in the first selectable key area, and wherein the logic presents a fourth plurality of selectable keys in the second selectable key area.

20. The system of claim 19 wherein the fourth plurality of selectable keys represents a forth collection of letters or character keys comprising at least one of emojis, punctuation, or control keys.

* * * * *